(12) United States Patent
Oden et al.

(10) Patent No.: US 12,233,609 B2
(45) Date of Patent: Feb. 25, 2025

(54) BUNDLING APPARATUS AND METHOD FOR MAKING PREFORM CHARGES

(71) Applicant: Arris Composites Inc., Berkeley, CA (US)

(72) Inventors: Greg Oden, Garden City, ID (US); Scott Digiorgio, Berkeley, CA (US); Rose Cheung Atkinson, Emeryville, CA (US); Zachary Aaron August, San Mateo, CA (US); Maxwell Harshorn Shimshak, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 61 days.

(21) Appl. No.: 18/229,604

(22) Filed: Aug. 2, 2023

(65) Prior Publication Data
US 2024/0042708 A1 Feb. 8, 2024

Related U.S. Application Data

(60) Provisional application No. 63/394,789, filed on Aug. 3, 2022.

(51) Int. Cl.
| B29C 70/54 | (2006.01) |
| B29B 11/04 | (2006.01) |
| B29B 11/16 | (2006.01) |
| B29C 70/08 | (2006.01) |

(52) U.S. Cl.
CPC ............ *B29C 70/543* (2013.01); *B29B 11/04* (2013.01); *B29B 11/16* (2013.01); *B29C 70/081* (2013.01); *B29C 2793/0054* (2013.01)

(58) Field of Classification Search
CPC ....... B29C 70/54; B29C 70/08; B29C 70/081; B29C 2793/0054; B29C 70/523; B29B 11/04; B29B 11/16
See application file for complete search history.

(56) References Cited

U.S. PATENT DOCUMENTS

| 4,894,105 | A | * | 1/1990 | Dyksterhouse | .......... C08J 5/249 |
| | | | | | 156/181 |
| 5,876,553 | A | * | 3/1999 | Kaiser | ................... B29C 70/525 |
| | | | | | 156/433 |
| 6,634,729 | B1 | * | 10/2003 | Schuman | ................. B41J 3/407 |
| | | | | | 347/2 |
| 10,807,319 | B2 | | 10/2020 | Escowitz | |
| 10,946,595 | B2 | | 3/2021 | Davidson et al. | |
| 11,090,883 | B2 | | 8/2021 | Pelman et al. | |
| 11,192,314 | B2 | | 12/2021 | Escowitz et al. | |
| 11,426,956 | B2 | | 8/2022 | Davidson et al. | |

(Continued)

OTHER PUBLICATIONS

"Circle packing in a circle", Wikipedia, 6 pp., https://en.wikipedia.org/wiki/Circle_packing_in_a_circle, Aug. 2, 2023.

*Primary Examiner* — Christopher M Rodd
*Assistant Examiner* — Shibin Liang
(74) *Attorney, Agent, or Firm* — Kaplan Breyer Schwarz, LLP

(57) ABSTRACT

A bundling apparatus for fabricating a preform charge consisting of plural preforms includes a guide module, a tacking module, a bundle-advancement module, and a cutting module, and optionally one or more of a bending module, a scoring module, and inspection module, a consolidation module, and a placement module.

17 Claims, 7 Drawing Sheets

(56) References Cited

U.S. PATENT DOCUMENTS

| | | | |
|---|---|---|---|
| 11,623,370 B2 | 4/2023 | Davidson et al. | |
| 2020/0114596 A1 | 4/2020 | Davidson et al. | |
| 2020/0209792 A1* | 7/2020 | Saito | G03G 15/2053 |
| 2020/0269529 A1* | 8/2020 | De Kock | B29B 7/90 |
| 2021/0354404 A1* | 11/2021 | Suriyaarachchi | B29C 70/545 |
| 2022/0009178 A1* | 1/2022 | Harada | B29C 70/461 |

* cited by examiner

BUNDLING APPARATUS AND METHOD FOR MAKING PREFORM CHARGES

STATEMENT OF RELATED CASES

This specification claims priority to U.S. 63/394,789, filed Aug. 3, 2022, and which is incorporated by reference herein.

FIELD OF THE INVENTION

The present invention pertains to a system for preparing fiber-composite feed constituents for compression molding.

BACKGROUND OF THE INVENTION

A fiber-composite part includes fibers that are dispersed within a resin matrix. The matrix, typically a thermoplastic or a thermoset, surrounds and supports the fibers by maintaining their relative positions in the part, in addition to protection them from abrasion and environmental attack. The fibers impart their mechanical and physical properties to enhance those of the matrix. The combination is synergistic; the composite possesses material properties unavailable from the individual constituents, such as a very high strength-to-weight ratio.

Applicant has developed novel compression-molding apparatuses and methods for fabricating fiber-composite parts. These processes use dimensioned fiber bundles, referred to by applicant as "preforms," as a basic feed constituent. Each preform includes thousands of individual fibers that are wetted/impregnated with thermoplastic resin. The preforms are typically created by cutting a run of towpreg into plural segments having a desired length. Depending on the shape of the mold cavity, as defined by the part being fabricated, the preforms are optionally bent into a desired shape.

In most of applicant's processes, before these fiber-bundle-based preforms are placed in a mold cavity, they are assembled into a "preform charge." The preform charge often has a shape similar to the mold cavity in which its placed and to the part being molded (i.e., a "near net" shape).

To create a preform charge, preforms are placed one-by-one into a specialized fixture ("preform-charge fixture"). By virtue of its structure (e.g., a cavity, a layout of cleats, posts, etc.), this fixture organizes the preforms into a desired form, often layering them to create 3D shapes of varying complexity. After the requisite number of preforms are appropriately arranged in the fixture, they are "tacked" together. The tacking process involves softening (and may involve a small amount of melting) of the thermoplastic resin in the preforms, and exposure to minimal pressure (up to a few hundred psi). In this softened state, the applied minimal pressure forces adjacent preforms to adhere to one another. After cooling, the assemblage of preforms maintains its shape and can be readily moved, en-masse, and placed in a mold cavity. Although the preform charge has a unitary form, often of near-net shape, the preforms in it remain distinct, since the temperature and pressure to which they are exposed are well below that required to fully consolidate the constituent fibers and resin.

The "fiber-bundle-based preform" and "preform charge," as described above, are unique to applicant's processes. Although a variety of benefits result from the use a preform charge (versus a conventional "layup" of preforms in a mold cavity for example), process inefficiencies remain.

SUMMARY

The present invention avoids some of the inefficiencies extant in the formation of applicant's preform charges. Embodiments of the invention provide a bundling apparatus that speeds the creation of such of a preform charge, as compared to applicant's existing processes.

In accordance with an illustrative embodiment, the bundling apparatus receives and aligns plural fiber bundles (e.g., towpreg or, more generally, the output of a resin-impregnation process), tacks the bundles together, and cuts them to an appropriate length. The output of the bundling apparatus is a "preform charge." In an illustrative embodiment, these tasks are performed by four modules of the bundling apparatus: (i) a guide module, (ii) a tacking module, (iii) a bundle-advancement module, and (iv) a cutting module.

The guide module receives fiber bundles from plural spools, and guides the bundles into a desired orientation relative to one another. Typically, but not necessarily, this orientation situates the bundles in co-planar and abutting relation. The tacking module adheres the fiber bundles to one another at one or more specified locations along their length. The bundle-advancement module controls the motion of the fiber bundles through the bundling apparatus. And the cutting module cuts the tacked fiber bundles to a desired length, as monitored by the bundle-advancement module.

Applicant's existing processes for creating a preform charge are capable of fabricating relatively more complex versions of a preform charge than the bundling apparatus described herein. But for a relatively simple preform charge, embodiments of the bundling apparatus can fabricate large numbers (i.e., production volumes) of such a preform charge considerably faster than applicant's existing processes.

In other embodiments in accordance with the present teachings, the bundling apparatus includes one or more of the following optional modules:

(a) A consolidation module that partially consolidates the distinct preforms of a preform charge by applying a radial compressive force while heating the preform charge. The volume of material does not change via the action of the consolidation module, but the preform charge will have a smaller cross-sectional area.

(b) A scoring module to score one or more of the fiber bundles (see U.S. Pat. No. 11,192,314). The scoring module partially cuts through one or more (but not all) of the fiber bundles after they are tacked. These cuts shorten the fibers within the scored fiber bundles below a threshold length (typically about 40 mm, or more preferably 25 mm), which enables them to flow along with melted resin material during the compression-molding process.

(c) A bending module enables the fabrication of a preform charge having a non-linear form by adding one or more bends to the fiber bundles prior to cutting, but (typically) after tacking. The bending module functions similarly to a bending device for a single fiber bundle, such as shown in FIG. 6 of U.S. Pat. No. 10,807,319.

(d) An inspection module(s) provides an ability to inspect the fiber bundles at one or more location as they pass through the bundling apparatus.

(e) A placement module may be used to transport the preform charge to a desired location after fabrication.

A preform charge formed by embodiments of the bundling apparatus will differ somewhat from a preform charge formed by other of applicant's processes, as explained below.

Specifically, in applicant's existing preform-charge fabrication processes, preforms are added to a preform-charge fixture to fabricate a preform charge. As such, the preforms must first be fabricated. In embodiments of the present invention, preform creation occurs as part of preform-charge fabrication.

Furthermore, regardless of which of applicant's processes are used, a preform charge is not fully consolidated (it will possess an unacceptably high amount of void content, thereby rendering it unsuitable for use as a finished part). Embodiments of the bundling apparatus simply tack adjacent fiber bundles together at a few discrete locations, and virtually no pressure is applied. As such, the resulting preform charge is minimally consolidated (essentially no consolidation). If the optional consolidation module is used, then the resulting preform charge will experience a greater degree of consolidation. In applicant's existing processes for fabricating a preform charge, adjacent preforms are tacked to one another all along their mutual interface, and there typically is some amount (up to a few hundred psi) of applied pressure. This results in a greater degree of (partial) consolidation than for a preform charge formed via embodiments of the present invention (even when the optional consolidation module is used).

And whereas a preform charge formed via applicant's existing processes will usually have a near net shape, a preform charge formed via embodiments of the invention often will not (unless the part to be formed has a simple structure).

However, the bundling apparatus enables substantially higher throughputs than some of applicant's previously developed processes for forming a preform charge because multiple fiber bundles are processed (e.g., tacked, cut, etc.) at the same time. Thus, as previously noted, the bundling apparatus incorporates preform creation (e.g., from a run of towpreg, etc.), whereas for applicant's prior processes, preforms are first formed and then added to a preform-charge fixture for the fabrication of a preform charge. In fact, a preform charge produced via the bundling apparatus can, for appropriate embodiments, be loaded into a preform-charge fixture.

Applicant fabricates most parts by placing a near-net shape preform charge in a mold cavity. Often, additional "loose" preforms are added to the mold cavity to supplement those present in a preform charge. The relatively "simple" preform charges fabricated from the bundling apparatus may suitably be used for that purpose. Compared to adding preforms one-by-one to supplement a preform charge having a complex structure, adding simple preform charges improves the efficiency of that operation.

Moreover, there are certain of applicant's compression-molding processes in which it is particularly advantageous to use a preform charge having a simple structure as a feed constituent. In one such process, as nominally operated, individual preforms are stacked in a transverse plunger cavity that feeds a mold cavity. After melting the resin in the preforms, a plunger is advanced, forcing the fibers and melted resin out of the transverse plunger cavity and into the mold cavity. By creating pressure differentials in the mold cavity, such as by opening vents at select locations, a flow of resin and fibers can be directed to desired regions within the mold cavity. By sequencing the actuation of vents, and appropriately stacking different preforms (e.g., having different lengths, different fiber types, etc.) in the transverse plunger cavity, the different fibers can be directed to different regions in the mold cavity (and hence the final part). This enhances the ability to tailor the composition of a part to the forces it is expected to experience when in use. See, e.g., U.S. Pat. Nos. 10,946,595, 11,426,956, 11,623,370.

As the "transverse plunger" process is currently practiced, the plunger cavity is filled by adding one preform at a time. This filling process is slow and has relatively poor repeatability, therefore limiting the rate at which parts can be produced. Adding simple preform charges to the transverse plunger cavity, as formed via embodiments of the bundling apparatus, will increase the rate of part production. Of course, applicant's existing methods may be used to create a "simple" preform charge for such use, but that would take longer (i.e., is less efficient) than using the bundling apparatus to create the "simple" preform charge.

In some embodiments, the invention provides an apparatus for forming a preform charge, the preform charge consisting of a plurality of preforms, the apparatus including a guide module, wherein the guide module receives the plurality of fiber bundles and aligns the plural fiber bundles so that each fiber bundle abuts at least one other fiber bundle; a tacking module, wherein the tacking module adheres at least some of the fiber bundles, after alignment, to adjacent fiber bundles; a bundle-advancement module, wherein the bundle-advancement module controls motion of the fiber bundles through the apparatus; and a cutting module, wherein the cutting module cuts the tacked fiber bundles to a desired length, thereby forming the preform charge consisting of a plurality of preforms.

In some other embodiments, the invention provides an apparatus for forming a preform charge, wherein in addition to including the guide module, the tacking module, the bundle-advancement module, and the cutting module, the apparatus includes one or more of the following modules: a bending module, a scoring module, an inspection module, a consolidation module, and a placement module.

DETAILED DESCRIPTION

Figure 1:
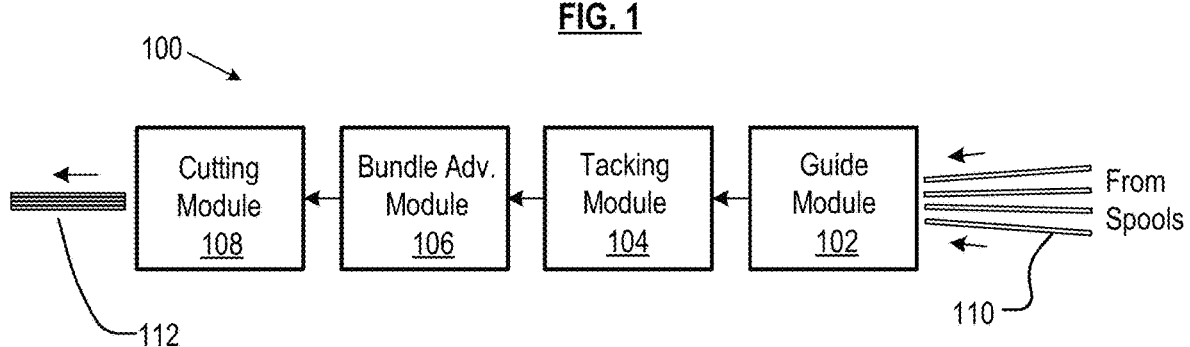
FIG. 1 depicts a block diagram of a bundling apparatus in accordance with the present teachings.

Definitions. The following terms are defined for use in this description and the appended claims:

"Fiber" means an individual strand of material. A fiber has a length that is much greater than its diameter.

"Fiber bundle" means plural (typically multiples of one thousand) co-aligned fibers.

"Stiffness" in the context of a material means resistance to bending, as measured by Young's modulus.

"Tow" means a bundle of fibers (i.e., fiber bundle), and those terms are used interchangeably herein unless otherwise specified. Tows are typically available with fibers numbering in the thousands: a 1K (1000 fibers) tow, 4K (4000 fibers) tow, 8K (8000 fibers) tow, etc.

"Prepreg" means fibers that are impregnated with resin.

"Towpreg" means a fiber bundle (i.e., a tow) that is impregnated with resin.

"Preform" means a segment of plural, co-aligned, resin-impregnated, typically same-length fibers. The segment is cut to a specific length, and, at least initially, is linear/straight; however, in many cases, will be shaped (e.g., bent at one or more locations, twisted, etc.) to a specific form, as appropriate for the specific part being molded. Preforms are usually sourced from towpreg (i.e., the towpreg is sectioned to a desired length), but can also be from another source of plural co-aligned, unidirectionally aligned fibers (e.g., a resin impregnation process, etc.). Preforms are preferably, but not necessarily, substantially circular, or oval in cross section and have a filamentous form. That is, preforms have a form factor akin to a filament—relatively long compared to its width, and having a typically circular or oval cross section. Applicant's use of the term "preform" explicitly excludes groupings of fibers having a relatively "flat" form factor, such as (i) tape/ribbon, (ii) sheets of fiber, and (iii) mats/laminates, cut to shape or otherwise. The modifier "fiber-bundle-based" may be pre-pended herein to the word "preform" to emphasize the nature of applicant's preforms and to distinguish them from prior-art preforms, which are typically in the form of tape/ribbon, sheets, mats, laminates, or shapes cut therefrom.

"Preform Charge" means an arrangement of preforms that are bound together (i.e., tacked) to maintain their position relative to one another. Preform charges are not fully consolidated ("excess" void space remains such that the preform charge will generally not meet the specifications for a finished part).

"Preform Layup" is an arrangement of preforms that is formed by placing the preforms, typically one-by-one, into a mold cavity. A preform "layup" is distinguished from a preform "charge," wherein for the latter, the feed constituents are bound to one another as a unitary structure, and the preform charge is typically formed outside of the mold cavity.

"Assemblage of feed constituents" refers to either a preform charge, a preform layout, or a combination of both.

"Consolidate," "consolidating," or "consolidation" means, in the present context, that in a grouping of fibers/resin, such as plurality of preforms, void space is removed to the extent possible and as is acceptable for a final part. Feed structures lose any unique or individual identity and any previously existing boundaries between adjacent preforms are lost. This usually requires significantly elevated pressure, either via gas pressurization (or vacuum), or the mechanical application of force (e.g., rollers, etc.), and elevated temperature (to soften/melt the resin).

"Partial consolidation" means, in the present context, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Compression molding" is a molding process that involves the application of heat and positive pressure to feed constituents, such as a preform charge, preform layup, or a combination thereof. The feed constituents are typically placed in a female mold portion having a mold cavity. After the requisite amount of feed constituents are placed in the female mold half, a second mold half—a male mold half—is joined to the female mold half and the mold cavity is closed. The male mold half usually includes features (e.g., a plunger, etc.) that extend into the female male half to engage the feed constituents therein. For applicant's processes, the applied pressure is usually in the range of about 500 psi to about 5000 psi, and temperature, which is a function of the resin being used, is typically in the range of about 150° C. to about 400° C. Once the applied heat has increased the temperature of the resin above its melt temperature, it is no longer solid and will flow. The resin will then conform to the mold geometry via the applied pressure, and the feed constituents are thereby consolidated, resulting in a nascent part with very little void space. Elevated pressure and temperature are typically maintained for a few minutes. After this compression molding protocol is complete, the mold is cooled. Once cooled, pressure is released, and a finished part is removed from the mold.

"Neat" resin means there are not fibers present therein.

"Compatible" means, when used in reference to two or more matrix materials, that the materials will mix and bond with each other.

"Upstream," as in "X is upstream of Y," means, when used in reference to a location in a process line, that "X" is relatively closer to the beginning/starting point of the processing line than "Y."

"Downstream," as in "X is downstream of Y," means, when used in reference to a location in a process line, that "X" is relatively further from the beginning/starting point of the processing line than "Y."

"About" or "Substantially" means +/−20% with respect to a stated figure or nominal value.

Other definitions may be provided elsewhere in this specification, in context. All patents and published patent applications referenced in this disclosure are incorporated by reference herein.

It is to be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. As a non-limiting example, a recited range of "1 to 10 µm" includes "5 to 8 µm", "1 to 4 µm", "2 to 9 µm", etc.

Feed Constituents. For applicant's existing compression-molding processes, typical feed constituents include a thermoplastic resin and fibers, typically in the form of a "preform."

The individual fibers can have any diameter, which is typically, but not necessarily, in a range of 1 to 100 microns. The individual fibers can have any length, which is application specific, as a function of the part being molded. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, carbon nanotubes, glass, natural fibers, aramid, boron, metal, ceramic, polymer, synthetic fibers, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Non-limiting examples of suitable synthetic fibers include nylon (polyamides), polyester, polypropylene, meta-aramid, para-aramid, polyphenylene sulfide, and rayon (regenerated cellulose).

Any resin thermoplastic resin that bonds to itself under heat and/or pressure can be used in conjunction with embodiments of the invention.

Exemplary thermoplastic resins useful in conjunction with embodiments of the invention include, without limitation, acrylonitrile butadiene styrene (ABS), ethylene tetrafluoroethylene (ETFE), fluorinated ethylene propylene (FEP), liquid crystal polymers (LCPs), polyamides (Nylon), polyaryletherketones (PAEK), polybenzimidazole (PBI), polybutylene terephthalate (PBT), polycarbonates (PC), and polycarbonate-ABS (PC-ABS), polyethylene (PE), polyetheretherketone (PEEK), polyetherimide (PEI), polyether sulfones (PES), polyethylene terephthalate (PET), perfluoroalkoxy copolymer (PFA), polyimide (PI), polymethylmethacrylate (PMMA), polyoxymethylene (polyacetals) (POM), polypropylene (PP), polyphosphoric acid (PPA), polyphenylene ether (PPE), polyphenylene oxide (PPO), polyphenylene sulfide (PPS), polyphenylsulfone (PPSU), Polystyrene (PS), polysulfone (PSU), polytetrafluoroethylene (PTFE), polyurethane (PU), polyvinyl chloride (PVC), styrene acrylonitrile (SAN), and styrene butadiene styrene (SBS). A thermoplastic can be a thermoplastic elastomer such as polyurethane elastomer, polyether ester block copolymer, styrenic block copolymer, polyolefin elastomer, polyether block amide, thermoplastic olefins, elastomeric alloys (TPE and TPV), thermoplastic polyurethanes, thermoplastic copolyesters, thermoplastic polyamides, and thermoplastic silicone vulcanizate.

Although less preferred and not suitable for many applications, thermoset resins may be used as appropriate. Non-limiting examples of suitable thermosets include araldite, bakelites, epoxies, melamines, phenol/formaldehydes, polyesters, polyhexahydrotriazines, polyimides, polyisocyanates, polyureas, silicones, urea/formaldehydes, vinyl esters, phenolics, and polycarbonates. Suitable thermosets can be prepared as a partially cured B-stage.

As previously noted, in applicant's existing compression-molding processes, the polymer resin and fiber are typically in the form of a "preform." Each preform include thousands of co-aligned, resin-infused fibers, typically in multiples of one thousand (e.g., 1k, 10k, 24k, etc.). A preform may have any suitable cross-sectional shape (e.g., circular, oval, trilobal, polygonal, etc.), but is most typically circular or oval. Preforms are typically formed from towpreg, but may also be sourced from the output of a resin-impregnation line. To create a preform from towpreg, etc., the bundle of fibers is cut into segments of a desired size and often shaped (e.g., bent, etc.) as well.

For the purposes of molding a part, preforms may be organized into an assemblage having a geometry and shape that is typically close to that of part being molded ("near net shape). In some embodiments, the preforms are placed one-by-one into the mold, creating a "lay-up." In some other embodiments, the preforms are first organized as a unitary structure that applicant refers to as a "preform charge."

A preform charge comprises a plurality of preforms that are "tacked" together. The term "tacking" references heating to the point of softening (and some limited amount of melting) to effectively join the preforms to create a single structure.

In applicant's existing processes for preform-charge creation, some amount (up to a few hundred psi) of applied pressure (i.e., compression) is applied for tacking. The preform charge, which is often created in a special fixture, usually conforms to the shape of the mold (and hence the part), or portions thereof. A preform charge having very complex shape can be fabricated in this manner. Because the resin in the preforms is not, for the most part, heated to liquefication during tacking, and the applied pressure is typically low (less than a few hundred psi and in some cases nothing more than the force of "gravity" acting on the preforms), the preform charge is not fully consolidated and thus could not function as a finished part. But once joined in this fashion, the preforms will not move, thereby maintaining the desired geometry and the specific alignment of each preform in the assemblage. See, e.g., Publ. Pat. App. US2020/0114596 and U.S. patent application Ser. No. 16/877,236. It is notable that the preforms are typically heated to a temperature that is above the heat deflection temperature of the resin, but typically below the melting point, although some minor amount of liquefication may take place.)

As used herein, the term "assemblage of preforms" refers to either a lay-up of preforms, as formed by placing preforms one-by-one into a mold cavity, or to a preform charge.

Bundling Apparatus 100. FIG. 1 depicts a block diagram of a bundling apparatus for forming a preform charge in accordance with the illustrative embodiment of the invention. Bundling apparatus 100 includes guide module 102, tacking module 104, bundle-advancement module 106, and cutting module 108, interrelated as shown.

Bundling apparatus 100 receives plural fiber bundles 110, typically fed thereto from spools (not depicted). In some embodiments, each fiber bundle is towpreg, or more generally, the output of a resin-impregnation process. Each bundle includes multiples of one thousand, co-aligned fibers, and is impregnated with a resin, preferably a thermoplastic resin. In some embodiments, one or more of the fiber bundles contain milled fiber ("milled fiber bundles"). Typically, the bundles have a circular or oval cross section. When using thermoplastic resins, the fiber bundles must be impregnated with the resin prior to processing via bundling apparatus 100. It is not possible to adequately wet dry fibers with thermoplastic resin after such processing.

Fiber bundles 110 are kept under tension as they pass through bundling apparatus 100. A slight amount of braking force may be applied during processing to ensure that each fiber bundle maintains alignment (e.g., does not twist, etc.) as it's fed to the bundling apparatus. But braking does add to the energy required for operating the apparatus, and may therefore be undesirable. The tension is provided by bundle-advancement module 106, as described below. Additionally, guide module 102 optionally includes tensioning devices.

In the embodiment depicted in FIG. 1, apparatus 100 receives and simultaneously processes four fiber bundles 110. In alternative embodiments, two, three, and more than four fiber bundles are capable of being processed. The spools of fiber bundle can be mounted in any orientation with respect to one another, as long as the fiber bundles can be guided into a desired alignment via guide module 102, as described further below.

Guide module 102 includes one or more guide elements that position fiber bundles 110 into a desired alignment. In various embodiments, the guide elements are: (i) closed structures, such as hollow rods through which the fiber bundles pass, plates with holes, etc., (ii) open structures such as channels or grooves, (iii) tensioned guides (e.g., spring-mounted, pneumatically-actuated, etc.) that maintain a set amount of tension on the fiber bundles as well as preventing them from diverting from their intended path, (iv) rollers, or (v) any other type of guide elements as is known in the art and suitable for use. The guide elements are selected to reduce friction on the fiber bundles as they travel through/past the guide elements. Exemplary materials for guide elements include polytetrafluoroethylene, polyurethane, steel, or aluminum. Additionally, these materials may have various surface treatments, such as to reduce friction, etc.; for example, the aluminum may be anodized, etc.

In some embodiments, guide module 102 may include plural guide elements that are disposed at different locations along bundling apparatus 100.

In some embodiments, guide module 102 positions fiber bundles 110 in parallel and abutting relation. For example, the four fiber bundles 110 depicted in FIG. 1 may be positioned in a 4×1 array. However, in alternative embodiments, other arrangements are possible. The bundles may, for example, be more generally organized into an m×n array, where n is the number of fiber bundles in a layer and where m is the number of layers of fiber bundles. For embodiments in which m≥2, the number of bundles in the layers may be different. As an example, one layer may have 3 bundles and another layer may have four bundles. Furthermore, the organization of bundles is not limited to an n×m array; for example, the fiber bundles may be organized in a variety of other arrangements, such as various circle-packing geometries. See, e.g., https://en.wikipedia.org/wiki/Circle packing in a circle.

Moreover, in some embodiments, at least some of fiber bundles 110 are not parallel to one another once aligned/positioned. More particularly, in some embodiments, a fiber bundle in a layer may be oriented so that it is not parallel with respect to other fiber bundles within that layer. In some embodiments, one or more fiber bundles in a first layer may have a different orientation than one or more fiber bundles in a second layer.

In some embodiments, following alignment, fiber bundles 110 are advanced to tacking module 104. The tacking module bonds fiber bundles 110 to one another at one or more discrete locations along their length. In some embodiments, tacking module 104 includes a tacking element as well as a motion actuator. The tacking element may be, for example, a heating block, ultrasonic bonder, IR bonding, hot air, or other structure for delivering energy to the fiber bundles. If the tacking element physically contacts fiber bundles 110, a motion actuator is required to move the tacking element into and out of contact with fiber bundles 110.

As the length of fiber bundles 110 increase, it is advisable to have multiple tack points. This reduces the likelihood of fiber bundles 110 separating from each other at any point along their length during subsequent processing.

In some embodiments, the tacking module includes two or more tacking elements for applying multiple simultaneous tacks, allowing the device to efficiently tack together longer fiber bundles. In some embodiments, the tacking module comprises two or more tacking elements that simultaneously contact the fiber bundles at the same point along the length thereof, but from different angles, such as the top and the bottom, in order to create a stronger tack.

Bundle advancement module 106, which tensions and advances fiber bundles 110, is located downstream of tacking module 104. In some embodiments, bundle advancement module 106 is implemented as a pair of rollers that apply pressure to fiber bundles 110 and advance them through apparatus 100. In some embodiments, bundle advancement module 106 also includes a drive motor for driving the rollers, and a device for controlling the pressure applied by the rollers to fiber bundles 110.

In some embodiments, bundle-advancement module 106 includes a rotary encoder to track the length of fiber bundles 110 being advanced through apparatus 100. This information can be used, for example, to determine where/when to cut the fiber bundles, thereby controlling the length of the preform charge 112 produced from bundling apparatus 100.

The tacked fiber bundles are advanced to cutting module 108. The cutting module cuts the tacked fiber bundles at a specific location to create preform charge 112. It is notable that the act of cutting creates "preforms" as well as a preform charge. In other words, the act of segmenting a fiber bundle (e.g., a length of towpreg, etc.) is the way a preform is created. In some embodiments, the cutting module is a single-blade, guillotine-style cutter. In other embodiments, other types of cutters suitable for cutting fiber bundles (in view of fiber type; e.g., carbon fiber, glass, etc.) may suitably be used.

It is notable that when cut with a guillotine-style or similar cutter, the fibers in the fiber bundles are compressed and tend to "snap" rather than being cut by the edge of the cutter blade. This may result in slight differences in the end locations of the fibers within the bundles, and can cause flaring of the ends of the fiber bundles (preforms) at the cut locations. This flaring can result in improper stacking of the resulting preform charge, such as when added to a preform-charge fixture, mold cavity, or transverse plunger cavity.

Consequently, in some embodiments, an ultrasonic cutter is advantageously used to cut the fiber bundles. An ultrasonic cutter vibrates a blade at ultrasonic frequencies, which improves the quality of the cut, and reduces the incidence of flaring at the cut ends, as mentioned above. The salient elements of an ultrasonic cutter include a blade, a transducer that generates oscillation, and an oscillator that drives the transducer. Typically, piezoelectric elements are incorporated in the transducer. The blade is resonated at ultrasonic frequencies by applying an AC voltage aligned with the characteristic frequency of transducer from the oscillator to the piezoelectric element.

Figure 2:
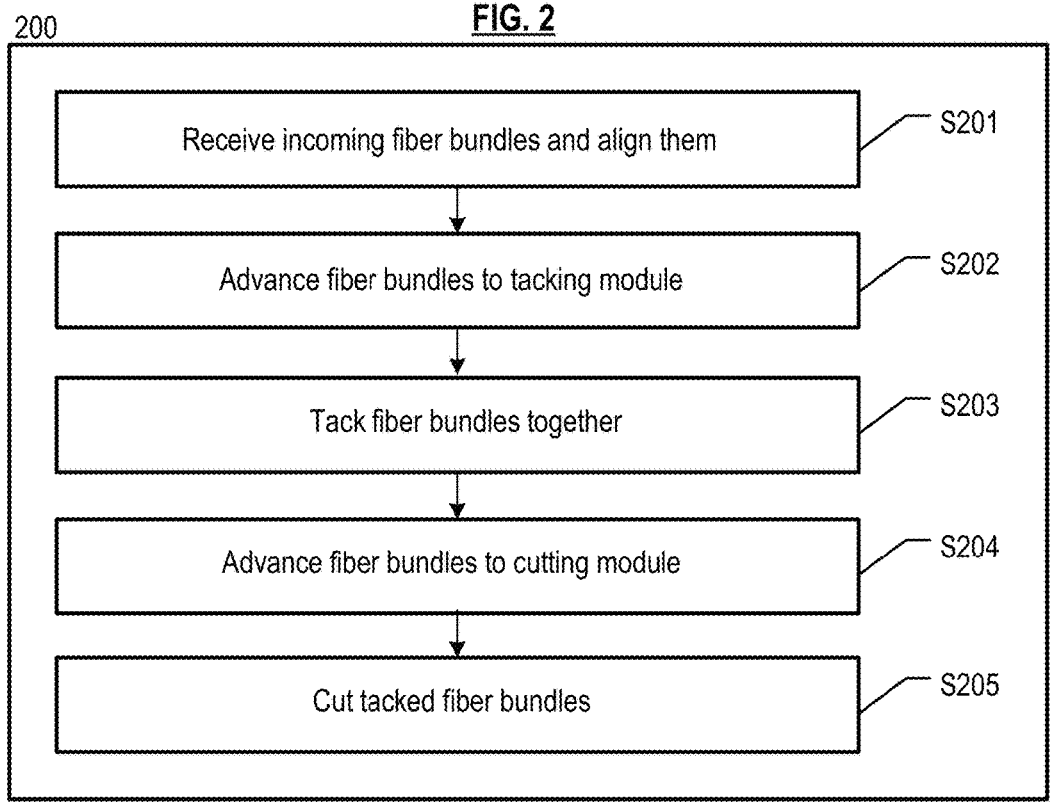
FIG. 2 depicts a block flow diagram of a method for bundling preforms to form a preform charge in accordance with the present teachings.

FIG. 2 depicts method 200 for forming a preform charge in accordance with the illustrative embodiment of the invention. Operation S201 of method 200 recites receiving fiber bundles and aligning them. This is accomplished via guide module 102 and bundle advancement module 106.

Per operation S202, fiber bundles 110 are advanced to tacking module 104. As previously discussed, fiber bundles 110 are advanced through apparatus 100 via bundle advancement module 106.

In accordance with operation S203, the aligned bundles are tacked together (at tacking module 104). This requires heating the bundles until they soften. There are a variety of ways in which processing can proceed. In some embodiments, the advance of fiber bundles 110 is stopped for the tacking operation. In some other embodiments, fiber bundles 110 continue to advance, and the tacking element of tacking module 104 advances with the fiber bundles. At the end of its advance, the tacking element returns to its initial position at a rapid rate while the advance of the fiber bundles is slowed. In some embodiments, the return of the tacking element is suitably rapid so that the fiber bundles maintain a constant rate through apparatus 100. In some embodiments, the tacking module 104 and cutting module 108 couple to a shuttle and are moved in unison. Advancement of the fiber bundles is performed by the bundle-advancement module, which has the additional function of metering the fiber bundles to ensure that they are cut to the desired length. Once a desired length of the fiber bundles has moved past the cutting module, the bundles are cut per operations S204 and 205, forming a preform charge.

The resulting preform charge may be handled in any of a variety of ways. For example, the preform charge may drop into a collection container, or, in some other embodiments, is picked up by a robotic arm and placed on a tray/rack, such as for transport to a mold at a future time. In yet some further embodiments, the preform charges can be placed via a robotic arm directly into a preform-charge fixture, or a compression mold cavity, or a transverse plunger cavity (which feeds a mold cavity).

Embodiment of Bundling Apparatus 100.

Figure 3:
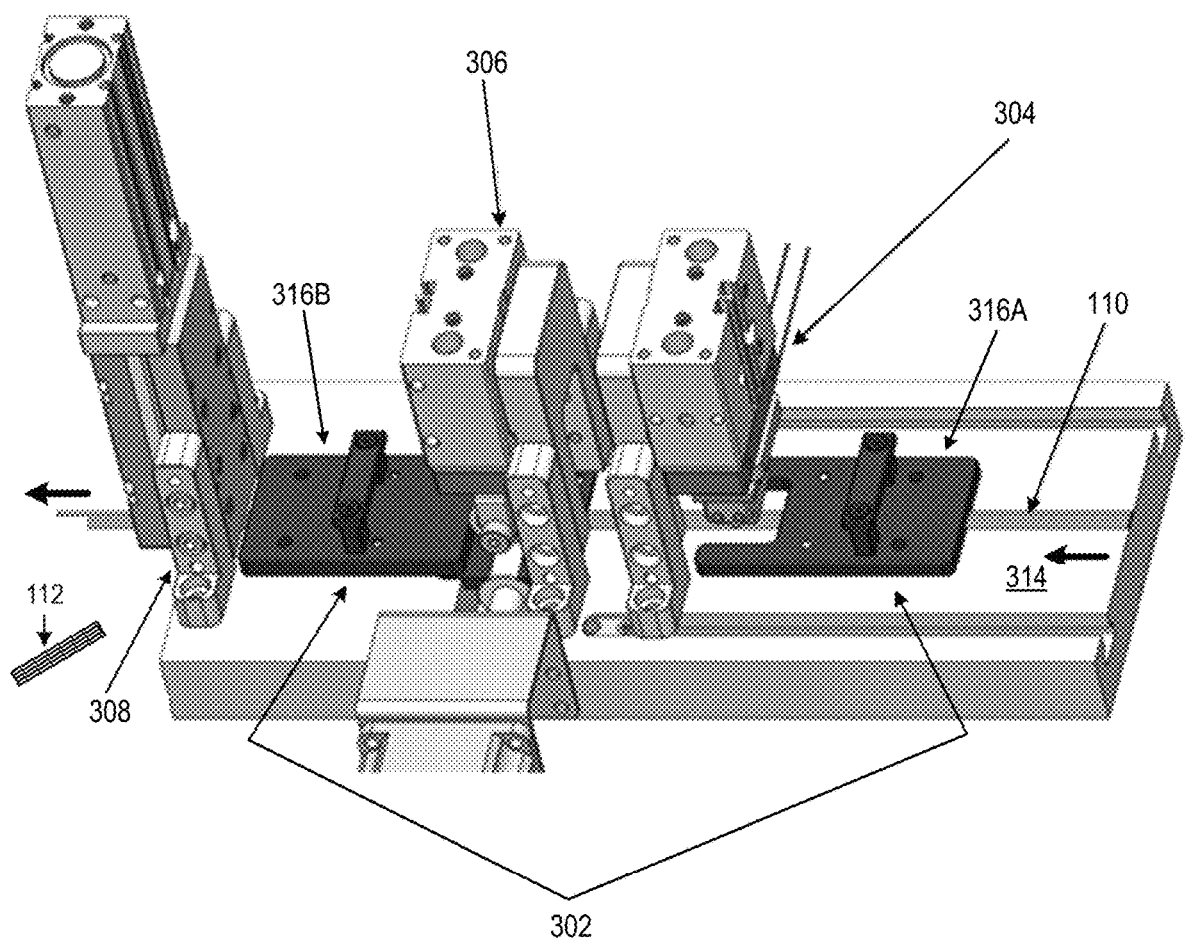
FIG. 3 depicts an embodiment of the bundling apparatus of FIG. 1.

FIG. 3 depicts bundling apparatus 300, which is an embodiment of bundling apparatus 100 of FIG. 1. Bundling apparatus includes guide module 302, tacking module 304, bundle-advancement module 306, and cutting module 308, interrelated as shown. All modules are disposed on plate 314. Processing of fiber bundles 110 proceeds from "right" to "left" in FIG. 3; preform charge 112 is the output from bundling apparatus 300.

Figure 4:
FIG. 4 depicts a front view of guide elements depicted in FIG. 3.

In the depicted embodiment, guide module 302 includes two guide elements 316A and 316B. Guide element 316A receives four fiber bundles 110 from spools (not depicted) and aligns them in a 4×1 array. FIG. 4 depicts a front view of guide 316A, showing channels 418 which function as guides for the fiber bundles.

Figure 5:
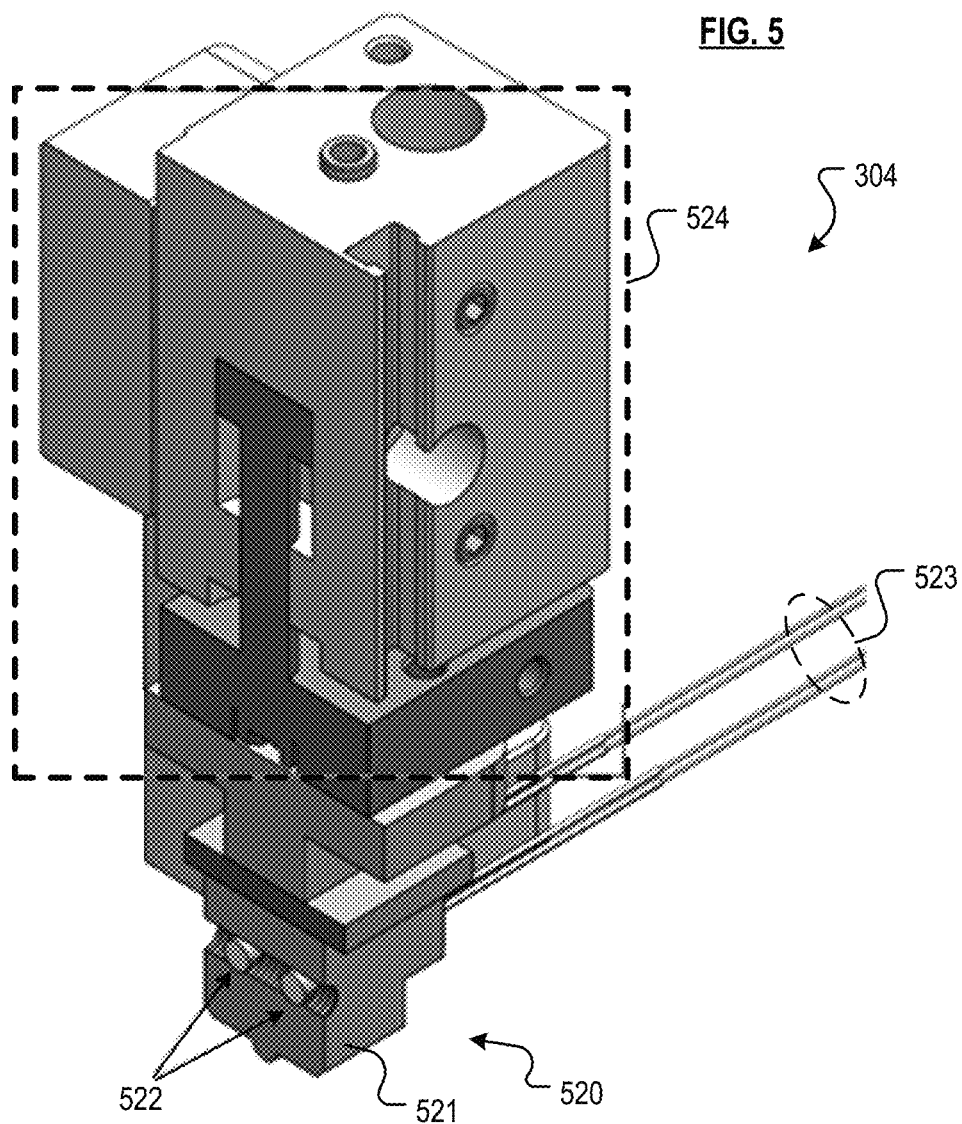
FIG. 5 depicts further detail of the tacking module depicted in FIG. 3.

Fiber bundles 110 advance from guide element 316A to tacking module 304. As depicted in FIG. 5, the salient elements of tacking module 304 of bundling apparatus 300 includes tacking element 520 and vertical-motion actuator assembly 524.

In the illustrative embodiment, tacking element 520 is a resistive heater, which includes metal block 521 and heaters 522. Wires 523 supply electrical current to tacking element 520.

Although tacking module 304 uses a single tacking element 520, in some other embodiments, two or more tacking elements 520 are included. The use of plural tacking elements 520 enables tacking module 304 to applying multiple simultaneous tacks, enabling it to efficiently tack together fiber bundles over a greater length. In some embodiments, the two or more tacking elements 520 are arranged to simultaneously contact a fiber bundle at the same point along its length, but from different angles, such as the top and the bottom, in order to create a stronger tack.

Vertical-motion actuator assembly 524 raises and lowers tacking elements 520 to place them into and out of contact with fiber bundles 110.

Figure 6:
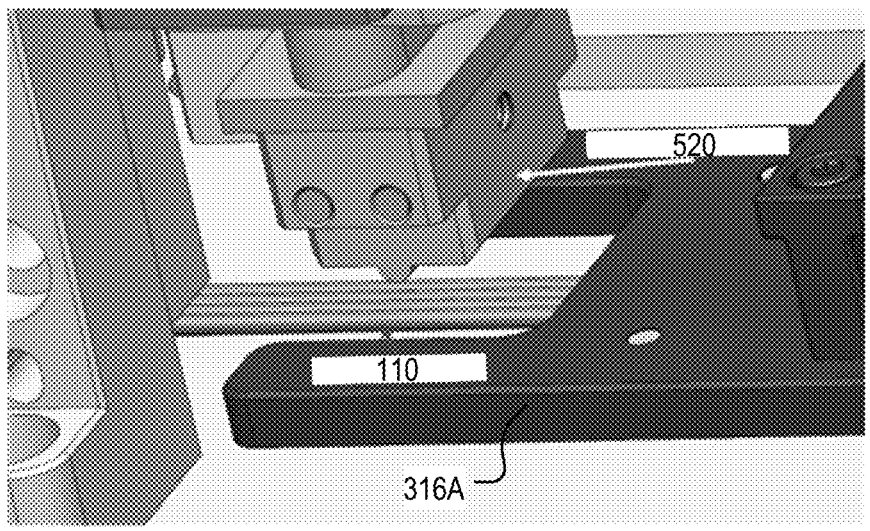
FIG. 6 depicts fiber bundles extending from the guide element and positioned under a tacking element of the tacking module depicted in FIG. 3.

FIG. 6 depicts the four aligned fiber bundles 110 positioned below tacking element 520 of tacking module 304. As depicted, tacking element 520 is not in contact with fiber bundles 110; in a subsequent operation, vertical-motion actuator assembly 524 is actuated to lower tacking element 520 and place it in contact with the fiber bundles.

In some embodiments, tacking element(s) 520 is stationary with respect to the length of fiber bundles 110. In some other embodiments, tacking element(s) 520 is movable backwards and/or forwards to tack the fiber bundles at various locations along their length.

In some embodiments, tacking module 304 tacks fiber bundles 110 together at what will eventually be the longitudinal midpoint of finished preform charge 112. For example, for a preform charge that is intended to have a length of 20 millimeters (mm), fiber bundles 110 may be tacked at the 10-mm midpoint. In some other embodiments, the fiber bundles are tacked at plural locations, for instance 5 mm from either end of a 20 mm segment. As the length of the preform charge being fabricated increases, it is advisable to increase the number of tack points. This reduces the likelihood of the bundles separating from each other at any point along their length. The preferred number and spacing of tack points for a given length of fiber bundle is best determined via routine experimentation.

Figure 7:
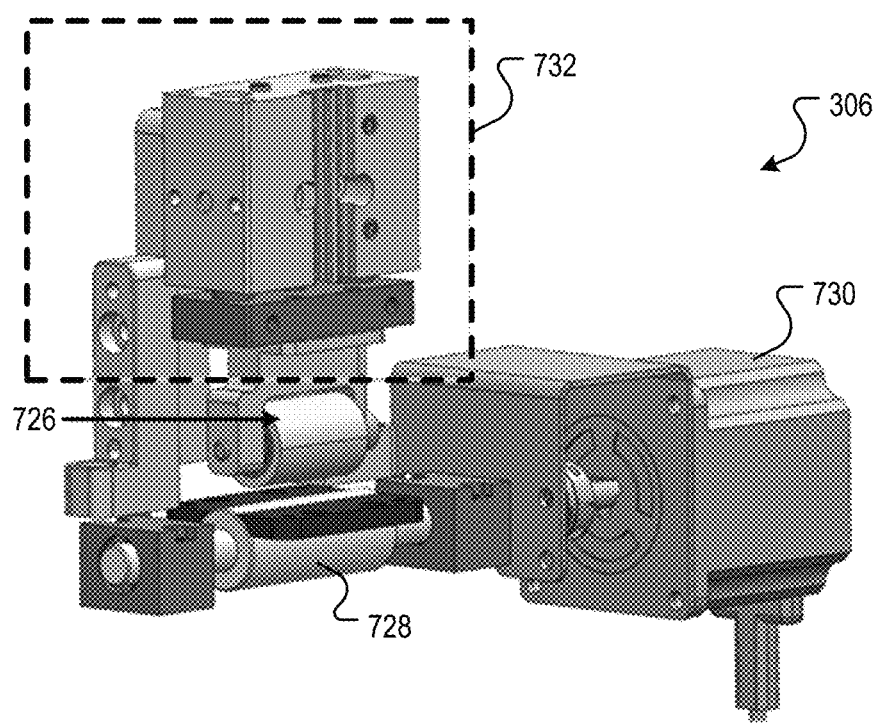
FIG. 7 depicts a three-quarters back perspective view of a bundle-advancement module of the bundling apparatus of FIG. 3.
Figure 8:
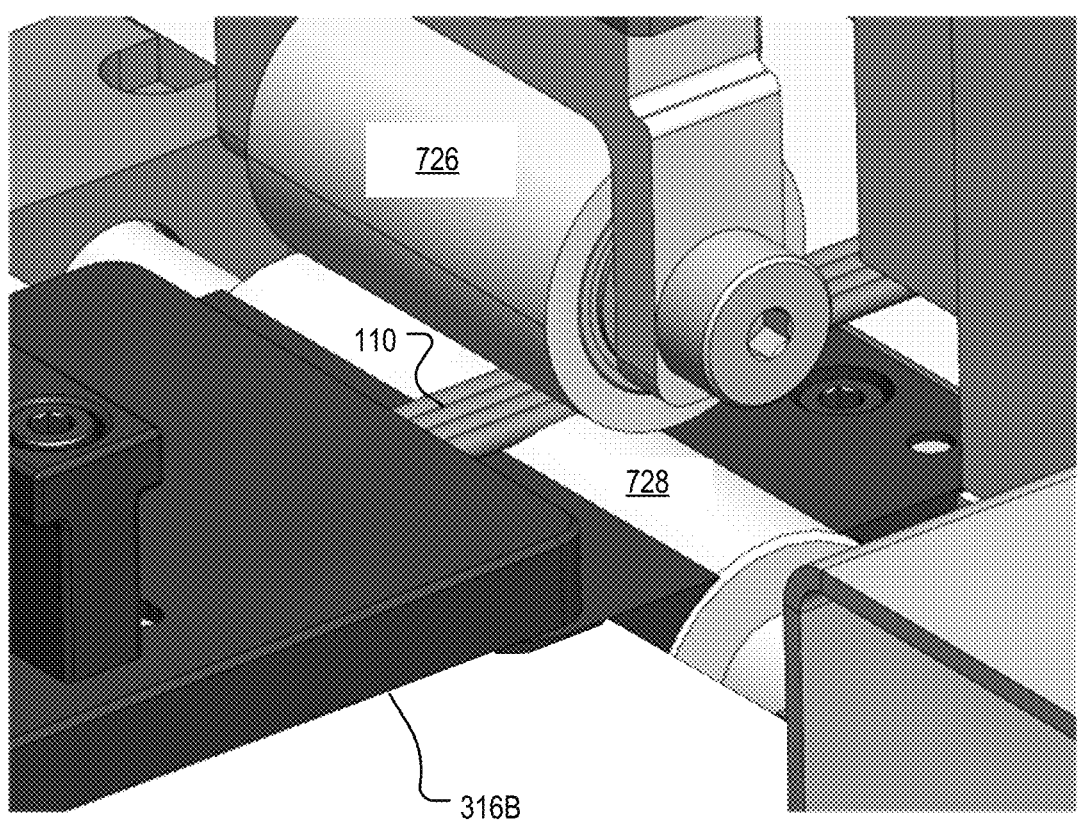
FIG. 8 depicts detail of the rollers of the bundle-advancement module depicted in FIG. 7.

FIG. 7 depicts bundle-advancement module 306, showing, among other elements, an upper (pinch) roller 726, lower (drive) roller 728, roller drive motor 730, and vertical-motion actuator assembly 732, interrelated as shown. FIG. 8 depicts aligned fiber bundles 110 passing between rollers 726 and 728.

Rollers 726 and 728, the latter driven by drive motor 730, advance (and tension) fiber bundles 110 through bundling apparatus 300.

In the illustrative embodiment, rollers 726 and 728 are made of different materials. Upper (pinch) roller 726 is made from a readily deformable material, such as polyurethane, etc., and bottom (drive) roller 728 is made of a nondeformable material, such as steel, etc. Drive roller 728, being made of a nondeformable material, will have greater durability and hence last longer than pinch roller 726, which is made of a deformable material. The use of a nondeformable material, as compared to a deformable material, results in a more accurate calculation of the advance of fiber bundles 110. But making both rollers 726 and 728 out of a nondeformable material is likely to result in uneven contact, and hence uneven pulling force, on fiber bundles 110. This is because fiber bundles 110 do not have an invariant diameter. And although making both rollers 726 and 728 from a nondeformable material would enable them to be pressed more tightly against fiber bundles 110, there is a risk of deforming the fiber bundles and/or damaging the rollers.

In contrast, fabricating one of the rollers out of a readily deformable material, such as polyurethane, enables it to yield when pressed into fiber bundles 110. This ensures that there is sufficient contact between fiber bundles 110 and the rollers to reliably and precisely advance the fiber bundles through the apparatus, while at the same time, avoid deforming the fiber bundles or cause excessive roller wear.

Vertical-motion actuator assembly 732 is used to control the pressure applied by upper pinch roller 726 on fiber bundles 110.

In some embodiments, bundle-advancement module 306 includes a rotary encoder to track the length of fiber bundles 110 being advanced through apparatus 300. This information may be used to determine where/when to cut fiber bundles 110, thereby controlling the length of finished preform charge 112.

In the illustrative embodiment, a second guide element 316B is positioned downstream of bundle-advancement module 306. The channels in guide element 316B (not depicted; see guide element 316A) effectively oppose stresses arising from forces imparted by processing that might otherwise tend to force fiber bundles 110 apart causing the "tacks" to fracture.

Figure 9:
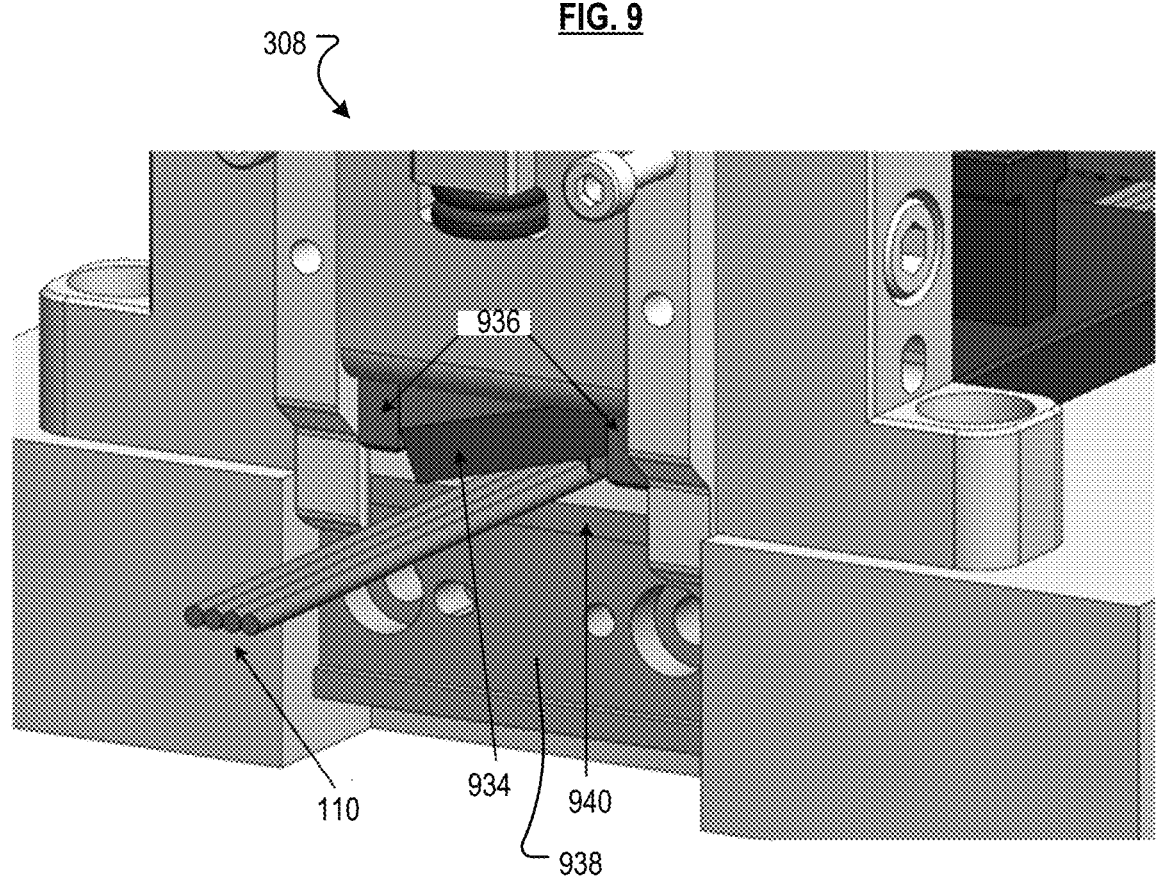
FIG. 9 depicts a cutting module of the bundling apparatus of FIG. 3.

FIG. 9 depicts cutting module 308. Once a desired length of tacked fiber bundles 110 has moved past the cutting module, the fiber bundles 110 are cut to create finished preform charge 112. In the illustrative embodiment depicted in FIG. 9, cutting module 308 is a guillotine-style cutter that includes single blade 934, which is guided along rails 936 that are flush with front 940 of metal base 938 that supports fiber bundles 110 as they are being cut. Rails 936 guide blade 934 so that ideally no space is left between it and front edge 940 of metal base 938.

As previously noted, in some embodiments, an ultrasonic cutter (not depicted) is used to cut fiber bundles 110. An ultrasonic cutter vibrates a blade at ultrasonic frequencies, which improves the quality of the cut, and reduces the incidence of flaring at the cut ends, as mentioned above.

Optional Modules.

Figure 10:
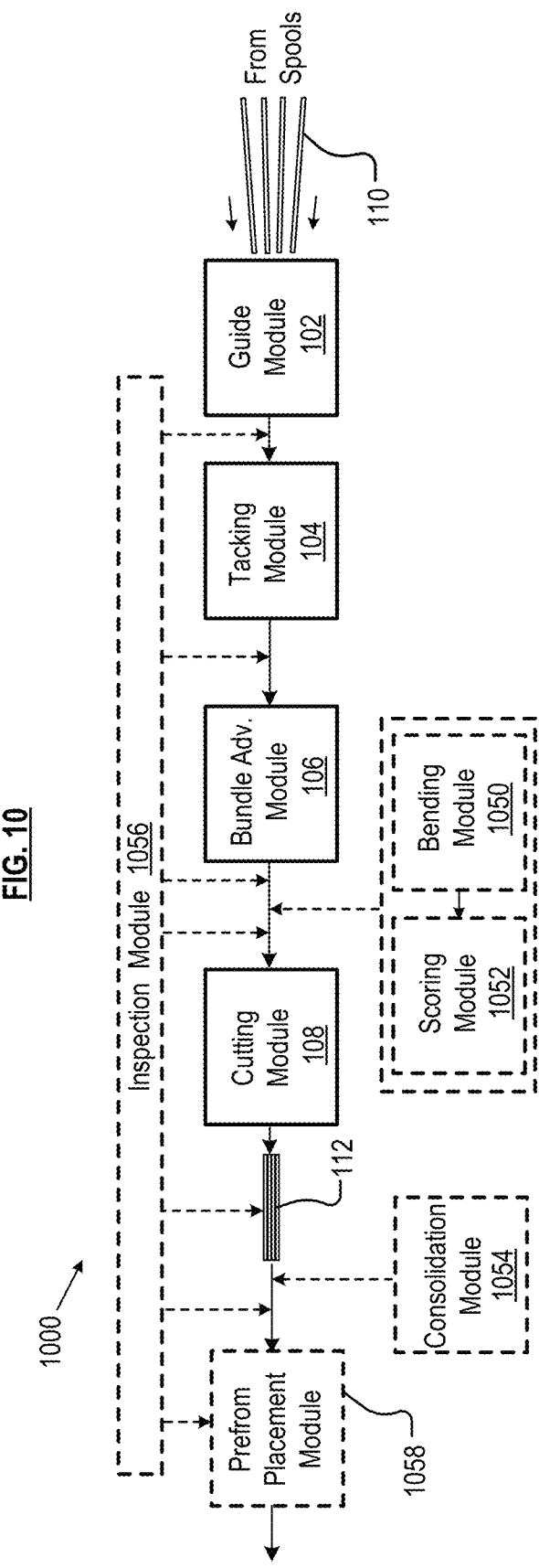
FIG. 10 depicts a block diagram of a bundling apparatus in accordance with the present invention that includes one or more optional features.

FIG. 10 depicts bundling apparatus 1000, which depicts further embodiments of bundling apparatus 100 of FIG. 1. In addition to the four modules contained in bundling apparatus 100 and bundling apparatus 300, apparatus 1000 depicts five optional modules, any one or more of which can be used in conjunction with the basic four modules (i.e., guide module 302, tacking module 304, bundle-advancement module 306, and cutting module 308).

The optional modules of bundling apparatus 1000 include bending module 1050, scoring module 1052, inspection module 1056, consolidation module 1054, and preform placement module 1058.

Bending module 1050 enables the fabrication of shaped bundles by adding bends to fiber bundles 110. The bending module functions similarly to a bending device for a single fiber bundle, such as shown in FIG. 6 of U.S. Pat. No. 10,807,319. In some embodiments, bending module 1050 is positioned to bend fiber bundles 110 after tacking, but before cutting. Preferably, but not necessarily, bending module 1050 is located downstream of bundle-advance module 106.

In some embodiments, bending module 1050 applies hot air to the tacked fiber bundles 110 to soften the resin, and then applies a force to bend the bundle around an axis. The difference between the apparatus referenced in U.S. Pat. No. 10,807,319 and a bending module suitable for use in conjunction with the present invention is that here, fiber bundles 110 must all be bent evenly and at the same time. If not, the "tacks" that adhere the bundles to one another may become displaced or break.

Scoring module 1052 is used to score one or more of fiber bundles 110. (See U.S. Pat. No. 11,192,314). Scoring module 1052 partially cuts through one or more fiber bundles 110, typically (but not necessarily) after they are tacked. These cuts are placed to shorten the fibers of appropriate fiber bundles to be below a threshold length (typically about 40 mm, and more preferably less than 25 mm), which enables them to flow along with melted resin material based on pressure gradients in a mold during a compression-molding process. Flowing fibers in this manner enables fibers to fill small features or regions within complex geometries that might otherwise be bereft of fibers, comprising only neat resin.

Figure 11A:
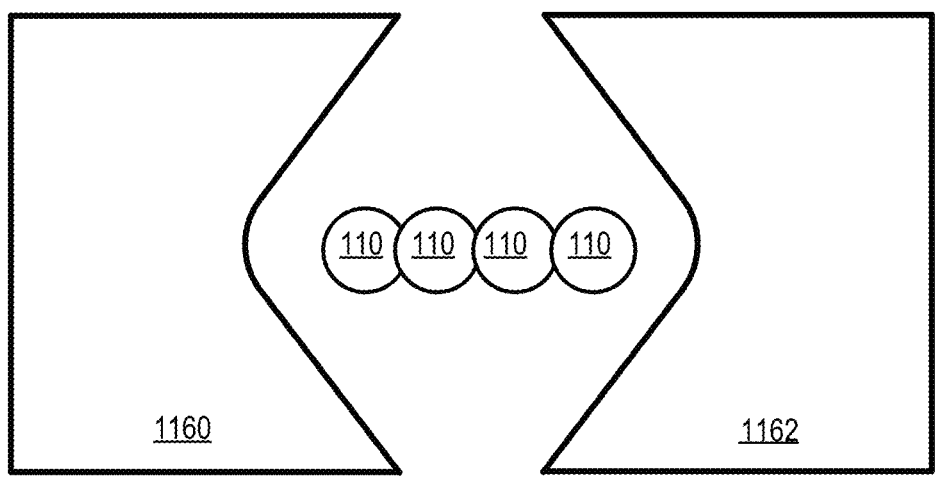
FIGS. 11A and 11B depict an optional scoring module.
Figure 11B:
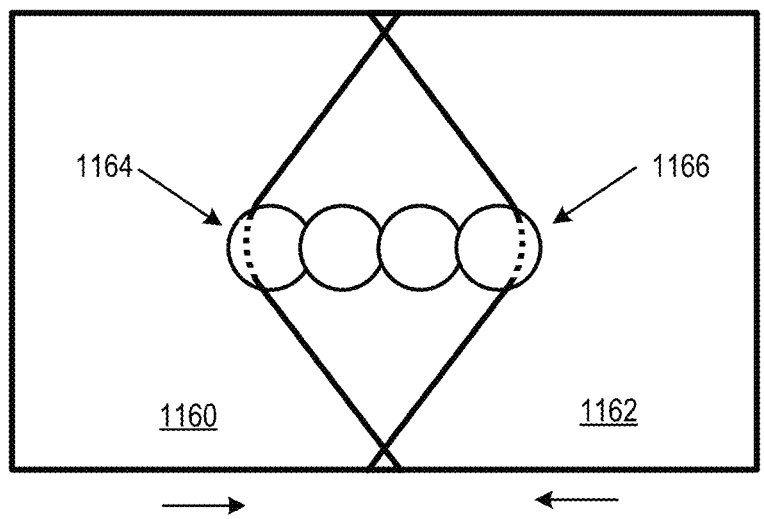

Scoring module 1052 includes blades made of any effective cutting material, such as, without limitation, brass, carbide, or carbon steel. FIGS. 11A and 11B depict scoring module 1152, which is an exemplary embodiment of scoring module 1052. Scoring module 1152 includes opposed blades 1160 and 1162. FIG. 11A depicts four tacked fiber bundles 110 disposed between the blades of scoring module 1152. FIG. 11B depicts the outermost fiber bundles being partially cut as the blades move "inwardly" (i.e., blade 1160 moves to the right and blade 1162 moves to the left). Resulting cuts 1164 and 1166 sever some, but not all, of the fibers and resin (typically thermoplastic) along a longitudinal section of the outermost portion of the left-most and right-most fiber bundles 110.

Figure 11C:
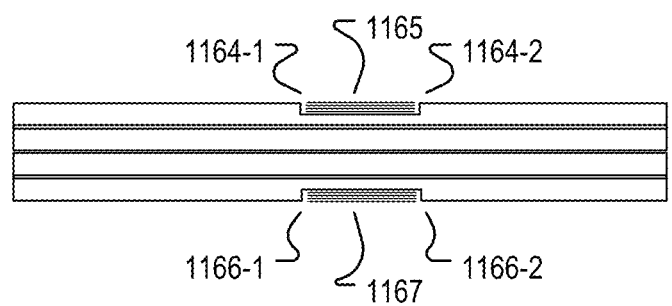
FIG. 11C depicts a scored preform charge

FIG. 11C depicts a top view of the four fiber bundles 110 after scoring. As depicted, two partial cuts 1164-1 and 1164-2 along one of the fiber bundles create segment 1165 of relatively shorter resin-impregnated fibers, and two partial cuts 1166-1 and 1166-2 along another of the fiber bundles create segment 1167 of relatively shorter resin-impregnated fibers.

In some embodiments, scoring module 1052/1152 is disposed upstream of cutting module 108, thus operating on fiber bundles 110. In some other embodiments, scoring module 1052/1152 is disposed downstream of cutting module 108, thus operating on preforms in preform charge 112. It is preferably to located scoring module 1052/1152 downstream of bundle-advance module 106.

In embodiments in which both bending module 1050 and scoring module 1052 are present, the scoring module is positioned to score fiber bundles 110 after they are bent.

Figure 12:
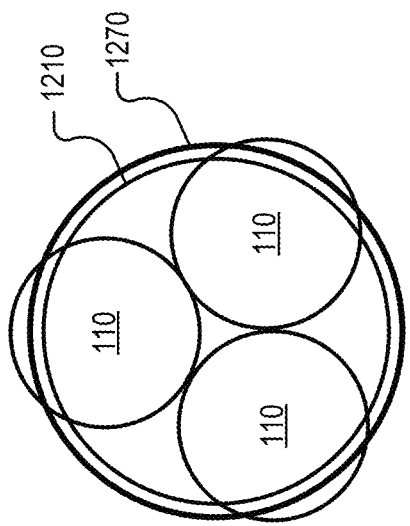
FIG. 12 depicts the effect of an optional consolidation module on the preform charge.

Referring now to FIG. 12, consolidation module 1054 is used to partially consolidate a preform charge 112 by applying a radial compressive force while heating. Consolidation module 1054 thus partially consolidates the plural individual preforms within preform charge 112. Consolidation module 1054 is useful when, for example, the form factor of an otherwise non-consolidated preform charge 112 prevents it from fitting into a region (such as transverse-plunger injection cavity 1270) due to the packing inefficiency of the circular cross section of the preforms.

In some embodiments, consolidation module 1054 is embodied as a double-open-ended steel cone (not depicted). In operation, preform charge 112 is fed to the larger end of the cone. The preform charge is heated as it passes through the cone. As it moves through the successively smaller diameter of the cone, the preform charge is radially compressed. By the time the preform charge reaches the small end of the cone, the individual preforms within the preform charge have become further consolidated into what is more nearly a single preform. In some further embodiments, the consolidation module can be realized as a chute, rollers, a stamp, or other compression mechanism.

In the illustrative embodiment, consolidation module 1054 is disposed after cutting module 108. In other words, consolidation module 1054 is acting on preform charge 112.

In some other embodiments, consolidation module 1054 is disposed before cutting module, such that it is acting on tacked fiber bundles.

Inspection module 1056 provides an ability to inspect the fiber bundles at one or more locations as they pass through the bundling apparatus. For example, inspection module 1056 may inspect fiber bundles 110 after they engage guide element 316A to verify proper alignment and before and/or after any subsequent processing step occurring at any of the modules. For example, inspection modules can be appropriately placed to inspect the quality of tacks, the quality and evenness of the bends, and the like. Additionally, inspection module(s) 1056 can be used inspect preform charge 112, and any of the optional operations that may be performed thereon (e.g., partial consolidation, scoring, etc.).

In some embodiments, inspection module 1056 includes cameras that are backlit by specifically colored screens of a known luminosity to provide high contrast between the fiber bundles and the background, and serve as the primary sensors in the inspection module. In yet some further embodiments, laser profilometers (to measure bundle surface profile) can be used in place of cameras, and weight scales are used to measure the weight of a finished preform charge 112. In some embodiments, inspection module 1056 utilizes laser micrometers to measure the evenness of the fiber bundles. This enhances the accuracy and precision of the system, and enables rapid detection of out-of-spec fiber bundle parameters.

Placement module 1058 may be used to transport preform charges(s) 112 after fabrication. In some embodiments, this module includes a robotic arm that grabs preform charge 112 after cutting (or before), and either: (i) places it in a tray that is filled with preform charges and transported to a preform-charge fixture or compression mold, or (ii) drops preform charges 112 onto a conveyor belt or into a chute which directs the bundles to a selector to filter the preform charges into "Acceptable" vs. "Unacceptable" bins.

Use of an automated robotic arm requires, in conjunction with embodiments of the invention, an end effector that grips or otherwise manipulates preform charges 112, which are unlikely to have a consistent shape over the lifetime of the end effector. In some embodiments, the end effector is made of a compliant material, such as polytetrafluoroethylene or polyurethane, to reduce any risk of the end effector damaging preform charges 112. Additionally, or alternatively, the robotic arm is equipped with a force-feedback sensor to ensure the end effector grips the preform charge with an appropriate amount of force.

In an alternative embodiment, placement module 1058 is a conveyor belt that moves preform charges 112 to a location away from bundling apparatus 1000, such as to a sorting station, a preform-charge fixture, a compression-molding apparatus, a bin, or other location. Preform charges 112 can be inspected by the inspection module while on the conveyor belt in order to determine if each preform charge is suitable for use.

In yet some further embodiments, preform-placement module 1058 comprises a tray with multiple slots for individual preform charges. As new preform charges 112 are cut by cutting module 108, the tray moves to accept a preform charge in an empty slot. Alternatively, the tray can be stationary and a chute or slide moves so that preform charge 112 falls into an empty slot in the tray. When the tray is full or a desired number of preform charges have been cut, the tray is then transported to a desired location, such as a preform-charge fixture, compression-molding apparatus, etc.

In a basic embodiment, the placement module comprises a chute with a selector door for selecting whether a preform charge 112 is directed to an "Acceptable" or "Unacceptable" bin. The selector door is operated based on a determination of an inspection module; preform charges 112 meeting selected criteria are guided into the "Acceptable" bin, while those that do not meet the criteria are guided into the "Unacceptable" bin.

It is to be understood that the disclosure describes a few embodiments and that many variations of the invention can easily be devised by those skilled in the art after reading this disclosure and that the scope of the present invention is to be determined by the following claims.

What is claimed:

1. An apparatus for forming a preform charge, the preform charge consisting of a plurality of preforms, the apparatus comprising:
   a guide module, wherein the guide module receives a plurality of fiber bundles and aligns the plural fiber bundles so that each fiber bundle abuts at least one other fiber bundle;
   a tacking module, wherein the tacking module adheres at least some of the fiber bundles, after alignment, to adjacent fiber bundles;
   a bundle-advancement module, wherein the bundle-advancement module controls motion of the fiber bundles through the apparatus;
   a cutting module, wherein the cutting module cuts the tacked fiber bundles to a desired length, thereby forming the preform charge consisting of the plurality of preforms.

2. The apparatus of claim 1 wherein the guide module includes a first guide element and a second guide element, wherein each guide element includes a plurality of channels for receiving and aligning the plurality of fiber bundles, and wherein the first guide element is positioned upstream of the tacking module and the second guide element is disposed downstream of the tacking module.

3. The apparatus of claim 2 wherein the plurality of channels aligns the plurality of fiber bundles into a 1×n array, wherein n is a number of fiber bundles in the plurality thereof.

4. The apparatus of claim 1 wherein the guide element aligns the plurality of fiber bundles into an alignment selected from the group consisting of: (i) a 1×n array, wherein n is a number of fiber bundles in the plurality thereof, (ii) an m×n array, wherein m is a number of layers in the array, and (iii) a circle packing geometry.

5. The apparatus of claim 1 wherein the tacking module comprises a tacking element for delivering energy to the fiber bundles, and a motion actuator for moving the tacking element into and out of contact with the fiber bundles.

6. The apparatus of claim 5 wherein the tacking element is a resistive heater.

7. The apparatus of claim 1 wherein the bundle-advancement module includes a drive roller, a pinch roller, a drive motor for driving the drive roller, and motion actuator, wherein the motion actuator controls a position of the pinch roller relative to the drive roller.

8. The apparatus of claim 7 wherein the pinch roller comprises a deformable material and the drive roller comprises a substantially nondeformable material.

9. The apparatus of claim 7 wherein the bundle-advancement module includes an encoder for determining an amount of linear motion of the fiber bundles.

10. The apparatus of claim 9 wherein the cutting module cuts the tacked fiber bundles to the desired length, forming preforms, based on information from the encoder.

11. The apparatus of claim 1 wherein the cutting module comprises a blade.

12. The apparatus of claim 11 wherein the cutting module comprises a transducer and an oscillator for vibrating the blade at ultrasonic frequencies.

13. The apparatus of claim 1 comprising a bending module for bending the fiber bundles.

14. The apparatus of claim 1 comprising a scoring module for partially cutting through at least one of the fiber bundles at one or more locations along a length thereof.

15. The apparatus of claim 1 comprising an inspection module for inspecting the fiber bundles at at least one location downstream of the guide module.

16. The apparatus of claim 1 comprising a consolidation module that at least partially consolidates the distinct preforms of the preform charge by applying a radial compressive force while heating the preform charge.

17. The apparatus of claim 1 comprising a placement module that transports the preform charge away from the apparatus.

* * * * *